July 22, 1958     J. W. LEFFORGE     2,844,442
METHOD OF PREPARING BRIGHT YELLOW COLORED SULFIDES
Original Filed July 23, 1954
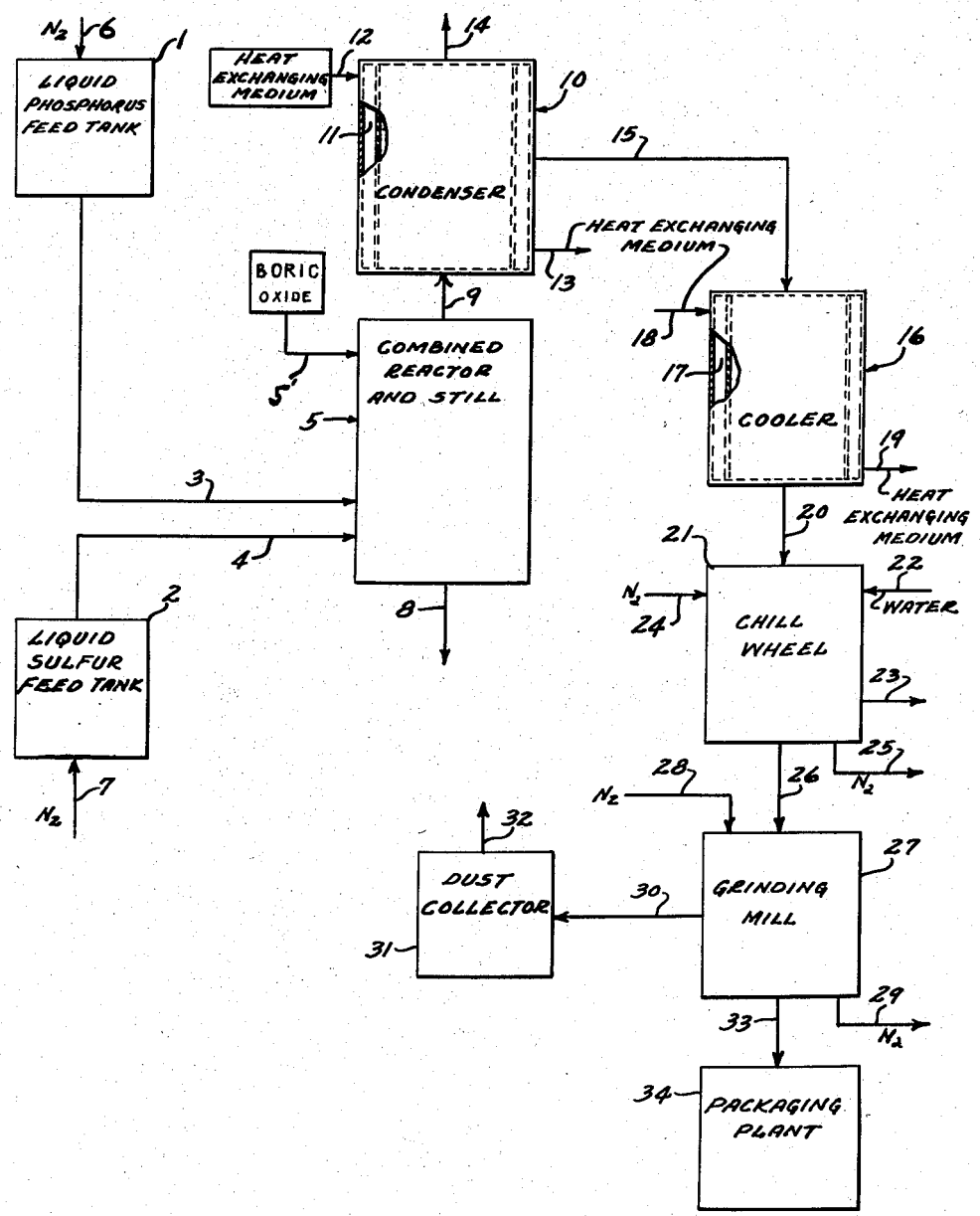
INVENTOR
JOHN W. LEFFORGE
BY Boyden L. Bussard
AGENT.

United States Patent Office 2,844,442
Patented July 22, 1958

2,844,442

METHOD OF PREPARING BRIGHT YELLOW COLORED SULFIDES

John W. Lefforge, Lynnfield Center, Mass., assignor to Monsanto Chemical Company, St. Louis, Mo., a corporation of Delaware Original application July 23, 1954, Serial No. 445,349. Divided and this application May 20, 1957, Serial No. 660,407

7 Claims. (Cl. 23—206)

This invention relates to phosphorus sulfides and to an improved method of producing same.

Heretofore, phosphorus sulfides have been prepared continuously by introducing phosphorus and sulfur with agitation into a molten heel of phosphorus sulfide and reacting these materials in the proportions calculated to yield the desired product. In carrying out this reaction, the exothermic heat is absorbed by the molten heel of phosphorus sulfide and thereby transferred to a suitable heat exchanging material or surface. The product of this reaction is withdrawn continuously from the reaction zone, flaked on chill rolls and then converted into a powder by grinding in a hammer mill or equivalent pulverizing device. This method provides a means of producing phosphorus sulfides continuously but is subject to certain disadvantages which render the method and product commercially unattractive.

For example, this method invariably yields darkly colored products as a result of the accumulation of impurities including those derived from the raw materials and the metal equipment. The color of these materials can be improved to some extent by distillation, but until the development of the invention disclosed and claimed in the application Serial No. 445,329, filed July 23, 1954, which has issued as Patent No. 2,794,705, June 4, 1957, such treatment has involved the use of additional heat and equipment, all of which add substantially to the overall cost of manufacturing these products.

Another disadvantage of this method is that if the phosphorus and sulfur feeds vary from a predetermined rate, the resulting product has a heterogeneous composition due to the presence of excess reactants or the formation of phosphorus sulfides other than the one desired.

In an application Serial No. 445,329, filed July 23, 1954, assigned to the same assignee as the instant application, a method of producing phosphorus sulfides of improved color is disclosed and claimed. In accordance with this method phosphorus and sulfur are introduced continuously into a boiling mass of phosphorus sulfides so as to effect a continuous reaction between the phosphorus and sulfur and continuous distillation of the reaction product. From the standpoint of economy of operation, simplicity of equipment, color improvement of product and product uniformity, this method represents a substantial advance in the art over the method previously described herein. However, it is not possible by this method to produce a phosphorus sulfide such as phosphorus pentasulfide of the desired yellow color for all of its numerous applications since it invariably yields a yellow product with a greyish cast. Thus, while this method yields products having a color which adapt it for many applications, there are certain ones such as the oil additive art in which it is not only desirable but essential that the phosphorus sulfide have a bright canary yellow color. Moreover, such a color is quite desirable from the standpoint of customer appeal and saleability of the product.

Therefore, it is the primary object of the instant invention to provide a method of producing phosphorus sulfides of uniform composition, which overcomes the disadvantages outlined above. More specifically it is an object of the instant invention to provide an economically and commercially feasible method of producing continuously phosphorus sulfides having a bright canary yellow color. Other objects and advantages will become apparent to those skilled in the art as the description of the invention proceeds.

I have developed an economically and commercially feasible method of making phosphorus sulfides having a bright canary yellow color, which represents a substantial advance in the art over the methods described earlier herein. In accordance with the preferred embodiment of this method, phosphorus and sulfur are introduced continuously into a heel of boiling phosphorus sulfide contained in a combined reactor and still wherein the exothermic heat of the phosphorus-sulfur reaction effects continuous distillation of the resulting reaction product. Simultaneously with the phosphorus-sulfur reaction, boric oxide is introduced continuously into the heel of boiling phosphorus sulfide so as to effect improvement in the color of the reaction product.

The distillate obtained as a result of the phosphorus-sulfur reaction is conveyed continuously to a hot condenser where the phosphorus sulfide vapor is condensed substantially completely while the uncondensed gases and phosphorus sulfide vapors are vented to the atmosphere. The condensed liquid phosphorus sulfide is cooled further and fed continuously onto a chill roll which solidifies and breaks up the product into flakes continuously. If desired, the phosphorus sulfide from the combined reactor and still may be cooled in the condenser to a safe operating temperature and fed continuously onto the chill roll. After leaving the chill roll, the flakes are ground continuously into a powder by means of a hammer mill or another equivalent pulverizing device.

As an alternative to this method, the product from the combined reactor and still, without treatment with boric oxide, is condensed continuously and subjected to combined distillation and treatment with boric oxide until the product has been converted to the desired bright canary yellow color.

As a further alternative to this method, the phosphorus-sulfur reaction products prepared by the methods of the prior art are subjected to combined distillation and treatment with boric oxide until the desired bright canary yellow color is obtained.

Stated broadly, the boric oxide is introduced into the phosphorus sulfide at a rate or in an amount sufficient to yield the desired yellow color. More specifically, the boric oxide is introduced at a rate of an effective amount up to about 5% by weight of the phosphorus sulfide.

For a more complete understanding of the improved method of making phosphorus sulfides, reference is made to the accompanying flow sheet which constitutes part of the instant specification.

Reference characters 1 and 2 represent phosphorus and sulfur feed tanks from which these reactants are continuously fed by nitrogen pressure via lines 3 and 4, respectively, into a heel of phosphorus sulfide contained in a combined reactor and still 5, the nitrogen used for this purpose being introduced into tanks 1 and 2 by way of lines 6 and 7, respectively.

The combined reactor and still 5 includes a still pot and in communication therewith a packed column containing porcelain Berl saddles, Pyrex glass rings and wool or equivalent materials. This combined reactor and still is provided with an outlet line 8 for discharging still bottoms therefrom and a discharge line 9 for conveying the distilled phosphorus sulfide vapors from the packed column setion (not shown) of the still to a hot condenser 10; it is also equipped with a line 5' for introducing boric oxide into the heel of phosphorus sulfide in the combined reactor and still 5.

The condenser 10 is provided with a jacket 11 having an inlet line 12 for introducing a heat-exchanging medium at a temperature of about 300° C. and an outlet line 13 for discharging the heat-exchanging medium at a temperature of about 305° C. from the jacket. The condenser is also equipped with a vent line 14 for discharging any inert uncondensable gas and traces of phosphorus sulfide from the system, and a take-off line 15 for conducting the condensed liquid phosphorus sulfide to a cooler 16.

The cooler 16 is provided with a jacket 17 having an inlet line 18 for introducing a heat-exchanging medium at a temperature of about 300° C. and an outlet line 19 for conducting the heat-exchanging medium at a temperature of about 305° C. from the jacket 17. In addition, the cooler 16 is equipped with a discharge line 20 for conveying the cooled phosphorus sulfide into an enclosed chill wheel 21.

The chill wheel 21 is cooled by means of water or another suitable medium introduced by line 22 and discharged therefrom by line 23; in addition, in order to avoid combustion of the phosphorus sulfide being flaked, it is blanketed by means of an inert gas such as nitrogen or carbon dioxide, etc. which is introduced by line 24 into the enclosure therefor (not shown) and discharged therefrom by means of line 25. This chill wheel 19 is provided with an outlet line 26 through which the flaked phosphorus sulfide is conveyed to a grinding mill 27 where the flakes are ground to a finely divided state.

The grinding mill 27 is purged by means of an inert gas such as nitrogen or carbon dioxide, etc. which enters the mill by line 28 and leaves by line 29, the purging being done as a precautionary measure to avoid combustion of the phosphorus sulfide. This grinding mill is provided with a line 30 for conveying fines to a dust collector 31 from which a portion of the inert purging gas is vented into the atmosphere by line 32. The grinding mill 27 is further provided with a line 33 for conveying the final product to the packaging plant 34.

The following specific example illustrates the method of carrying out the instant invention employing the system illustrated in the accompanying drawing.

Liquid phosphorus and liquid sulfur were continuously charged under nitrogen pressure into a heel of phosphorus pentasulfide in substantially the proportions required to yield the pentasulfide and a yellowish grey product was collected continuously as a distillate. Then, the feeding of phosphorus and sulfur was discontinued and the distillation continued by the external application of heat. No improvement in color of the product was obtained.

Approximately 1% by weight (basis heel of phosphorus pentasulfide) of boric oxide was added to the heel and the distillation continued for a period of about ¾ hour. The phosphorus pentasulfide product recovered from the operation had a bright canary yellow color, thus demonstrating the effectiveness of boric oxide in improving the color of this product.

In like manner phosphorus heptasulfide and phosphorus sesquisulfide having a bright yellow color can be produced in a continuous manner by continuously feeding boric oxide and the reactants in the proportions required to yield these products and by operating at a temperature equivalent to the boiling points of the heptasulfide and sesquisulfide, respectively, at the operating pressure.

In the production of phosphorus pentasulfide in accordance with the instant invention, phosphorus and sulfur are continuously fed to a combined reaction and distillation zone where they are reacted together in a heel of the reaction product and at a temperature at least equivalent to the boiling point of the reaction product at the operating pressure. When operating at atmospheric pressure, the reaction temperature used in the formation of phosphorus pentasulfide should fall substantially in the range of about 505° C. to 525° C., whereas in the production of phosphorus sesquisulfide and phosphorus heptasulfide, the reaction temperature should fall within the ranges of from about 400° C. to about 420° C. and from about 520° C. to about 535° C., respectively.

The reactants are introduced continuously into the heel of phosphorus sulfide at a rate producing a reaction temperature at least equivalent to the boiling point of the phosphorus sulfide, thus insuring continuous distillation of this product substantially as rapidly as it is formed. If desired, the reaction heat may be supplemented by the application of external heating means to the combined reactor and still.

In the production of phosphorus sesquisulfide or phosphorus heptasulfide, the heat of reaction in excess of that required for distillation is dissipated in the condenser by using a distillation rate greater than the production rate and permitting a portion of the condensate to return from the condenser to the reactor still pot and by its cooling action maintain the desired temperature and production rate.

Boric oxide is introduced continuously into the heel of the phosphorus sulfide simultaneously with the phosphorus and sulfur at a rate sufficient to produce a product having the desired bright yellow color. In producing a bright yellow phosphorus pentasulfide, boric oxide is introduced into the heel of phosphorus pentasulfide with phosphorus and sulfur at a rate sufficient to provide the desired color improvement, but not to exceed about 5% by weight of the phosphorus and sulfur.

Somewhat lower feed rates for the additive can be used in the production of a bright yellow colored phosphorus sesquisulfide or phosphorus heptasulfide since these products do not present a color improvement problem that is as serious as is encountered in the manufacture of phosphorus pentasulfide.

Instead of introducing the boric oxide into the heel of phosphorus sulfide, the distilled product may be condensed and then subjected to combined distillation and treatment with the boric oxide to form a light colored product.

The product leaving the combined reaction and distillation zone is cooled to condense the phosphorus sulfide, the temperature used varying with the particular phosphorus sulfide being produced. In the case of phosphorus pentasulfide, the product from the combined reaction and distillation zone is cooled to a temperature of about 500° C. or to a lower temperature above its solidification point to effect substantially complete condensation of the phosphorus pentasulfide.

The condensed phosphorus pentasulfide at a temperature of about 500° C. flows into a cooler where it is cooled to about 300 to 350° C. However, this temperature is not fixed since it varies with the phosphorus sulfide being produced, the only limitation being that the liquid phosphorus sulfide should not be cooled to a temperature preventing free flow thereof onto the chill wheel. This cooling step may be omitted if the product is cooled to a safe operating temperature in the condensation zone.

The liquid phosphorus sulfide is discharged continuously from the condenser or cooler onto a chill wheel and converted into flakes which are introduced continuously into a grinding mill where they are ground to a finely divided state.

The flaking and grinding operations are preferably carried out in the presence of a dry inert atmosphere, but the invention is by no means restricted thereto since this is merely a desirable precautionary measure designed to prevent decomposition of the product by air and moisture.

The products of the instant invention are suitable for use in organic synthesis and in a number of commercial applications such as anticorrosive agents and antioxidants for oils, and in the manufacture of extreme-pressure lubricants, match compositions and vulcanized rubber.

This application is a division of my copending application Serial Number 445,349, filed July 23, 1954.

I claim:

1. A method of preparing bright yellow colored phosphorus sulfides which comprises introducing boric oxide into a mass of darkly colored phosphorus sulfide, and subjecting the resulting product to distillation to separate said phosphorus sulfide in the form of a product having a bright yellow color, said boric oxide being employed in an amount sufficient to produce said color improvement.

2. A method of preparing bright yellow colored phosphorus pentasulfide which comprises introducing boric oxide into a mass of darkly colored phosphorus pentasulfide and subjecting the resulting product to distillation to separate said phosphorus pentasulfide in the form of a product having a bright canary yellow color, said boron oxide being employed in an amount sufficient to produce said color improvement.

3. The method of claim 2, wherein 1 percent by weight, based on the heel of phosphorus pentasulfide, of boric oxide is employed.

4. A method of preparing bright yellow colored phosphorus sulfides which comprises continuously introducing phosphorus, sulfur and boric oxide into a boiling mass consisting of phosphorus sulfide, and thereby effecting a continuous reaction between said phosphorus and said sulfur and continuous distillation of said reaction product in the form of a product having a bright yellow color, said phosphorus and said sulfur being introduced continuously into said boiling mass in substantially the proportions calculated to yield said phosphorus sulfide and at a rate maintaining said mass in a boiling condition, and said boric oxide is introduced at a rate sufficient to produce said color improvement.

5. The method of claim 4, wherein the phosphorus sulfide is phosphorus pentasulfide and the boric oxide is added at a rate not to exceed about 5 percent by weight of the phosphorus and sulfur continuously added to the boiling mass of phosphorus pentasulfide.

6. The method of claim 5, wherein about 1 percent of boric oxide is employed.

7. A method of preparing bright yellow colored phosphorus sulfides which comprises continuously introducing phosphorus, sulfur and boric oxide into a boiling mass consisting of a phosphorus sulfide selected from the group consisting of phosphorus pentasulfide, phosphorus heptasulfide and phosphorus sesquisulfide, and thereby effecting a continuous reaction between said phosphorus and said sulfur and continuous distillation of said reaction product in the form of a product having a bright yellow color, said phosphorus and said sulfur being introduced continuously into said boiling mass in substantially the proportions calculated to yield said phosphorus sulfide and at a rate maintaining said mass in a boiling condition, and said boric oxide is introduced at a rate sufficient to produce said color improvement.

No references cited.